US007568474B2

(12) United States Patent
Rudolph et al.

(10) Patent No.: US 7,568,474 B2
(45) Date of Patent: Aug. 4, 2009

(54) METHOD AND DEVICE FOR OPERATING A DIESEL MOTOR USING A FUEL THAT COMPRISES VEGETABLE OILS OR RECYCLED VEGETABLE OILS

(75) Inventors: Stephan Andre Rudolph, Einbeck-Wenzen (DE); Peter Rene Rudolph, Laage (DE)

(73) Assignees: Diertbert Rudolph, Einbeck-Wenzen (DE); Stephan Andree Rudolph, Einbeck-Wenzen (DE); Patrick Rudolph, Einbeck-Wenzen (DE); Tanja Von Flemming, Alfred (DE); Dirk Wenzel, Sarstedt (DE)

( * ) Notice: Subject to any disclaimer, the term of this patent is extended or adjusted under 35 U.S.C. 154(b) by 646 days.

(21) Appl. No.: 10/543,890

(22) PCT Filed: Jan. 27, 2004

(86) PCT No.: PCT/DE2004/000120

§ 371 (c)(1),
(2), (4) Date: May 8, 2006

(87) PCT Pub. No.: WO2004/067946

PCT Pub. Date: Aug. 12, 2004

(65) Prior Publication Data

US 2006/0254133 A1    Nov. 16, 2006

(30) Foreign Application Priority Data

Jan. 28, 2003 (DE) ............................... 103 03 139

(51) Int. Cl.
*F02M 37/04* (2006.01)
(52) U.S. Cl. ....................................................... 123/538
(58) Field of Classification Search ......... 123/536–538, 123/543–557
See application file for complete search history.

(56) References Cited

U.S. PATENT DOCUMENTS

| 2,732,835 | A | | 1/1956 | Hundt |
| 4,227,817 | A | | 10/1980 | Gerry |
| 4,344,404 | A | * | 8/1982 | Child et al. ................. 123/538 |
| 4,463,708 | A | | 8/1984 | Gerry |
| 4,590,915 | A | * | 5/1986 | Yamauchi et al. ........... 123/590 |
| 4,742,810 | A | * | 5/1988 | Anders et al. ............... 123/538 |
| 4,862,858 | A | * | 9/1989 | Goldsberry ................. 123/538 |
| 6,732,720 | B2 | * | 5/2004 | Kelemencky ............... 123/536 |
| 2005/0027137 | A1 | * | 2/2005 | Hooker ....................... 554/176 |
| 2005/0172700 | A1 | * | 8/2005 | Sugiura ..................... 73/61.48 |
| 2005/0183324 | A1 | * | 8/2005 | Marelli ....................... 44/301 |
| 2008/0264047 | A1 | * | 10/2008 | Griffiths et al. ............... 60/299 |

FOREIGN PATENT DOCUMENTS

| DE | 010250483 A | * | 5/2004 |
| GB | 1 150 306 A | | 4/1969 |
| GB | 2 185 783 A | | 7/1987 |
| SU | 1 206 130 A | | 1/1986 |
| SU | 1 255 460 A | | 9/1986 |
| SU | 1 262 083 A1 | | 10/1986 |
| WO | WO 02/068565 A1 | | 9/2002 |

* cited by examiner

*Primary Examiner*—M. McMahon
(74) *Attorney, Agent, or Firm*—Collard & Roe, P.C.

(57) ABSTRACT

The invention relates to a method and a device for operating a diesel motor using a fuel that comprises vegetable oils or recycled vegetable oils. The fuel is withdrawn from a tank, filtered through a fuel filter and injected into the cylinders through injection nozzles by means of an injection pump. Any excess fuel is returned. The fuel is transferred from the tank via pressure-resistant fiber filters by means of a forcing pump to a storage reservoir, where it is irradiated ultrasonically. The fuel is sucked out of the storage reservoir by the injection pump and excess fuel is returned to the storage reservoir.

20 Claims, 3 Drawing Sheets

Figure 1:
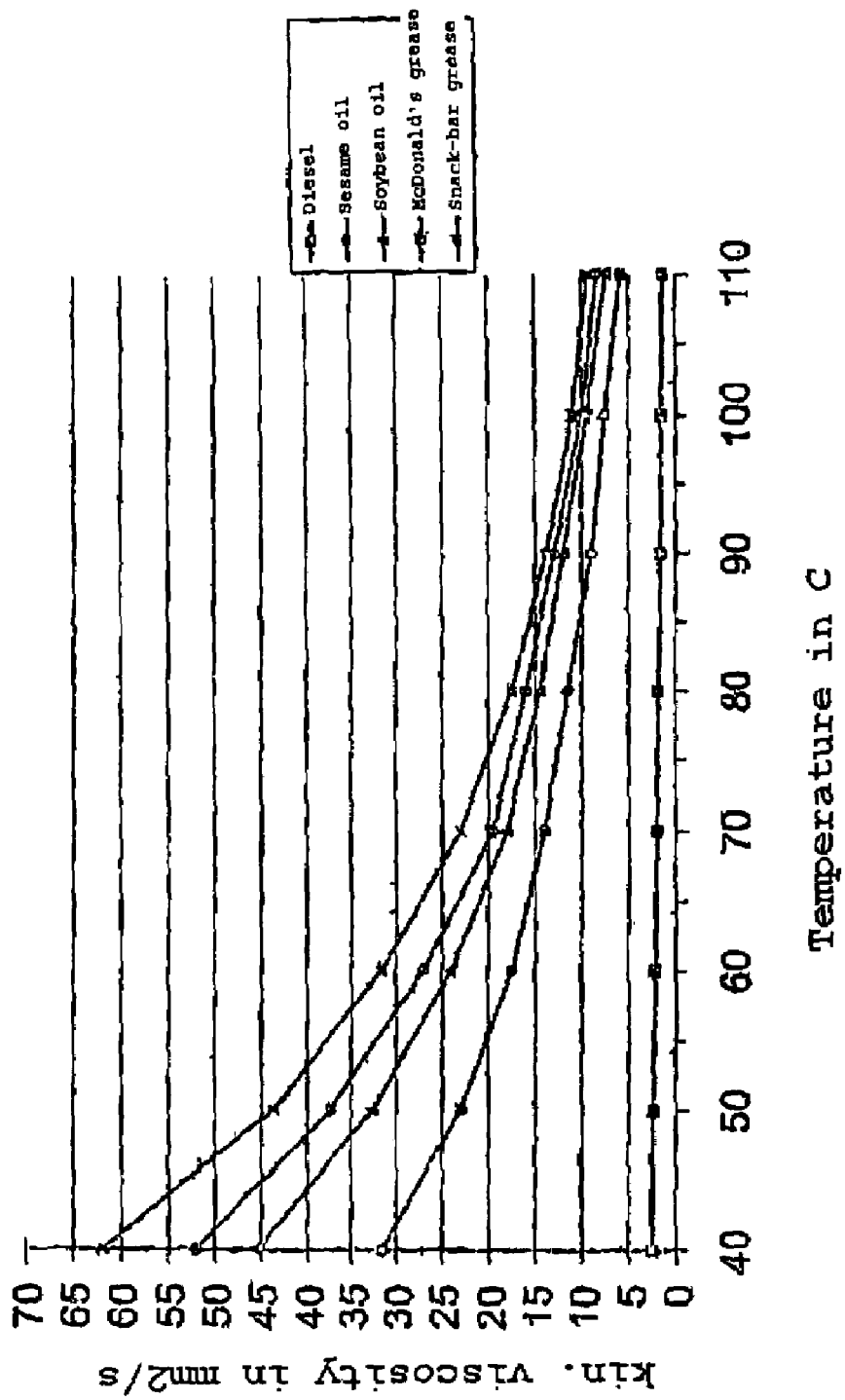

METHOD AND DEVICE FOR OPERATING A DIESEL MOTOR USING A FUEL THAT COMPRISES VEGETABLE OILS OR RECYCLED VEGETABLE OILS

CROSS REFERENCE TO RELATED APPLICATIONS

Applicants claim priority under 35 U.S.C. §119 of German Application No. 103 03 139.1 filed Jan. 28, 2003. Applicants also claim priority under 35 U.S.C. §365 of PCT/DE2004/ 000120 filed Jan. 27, 2004. The international application under PCT article 21(2) was not published in English.

The invention pertains to a method and a device for operating a diesel engine with a fuel that comprises vegetable oils or recycled vegetable oils.

The utilization of vegetable oils or recycled vegetable oils in diesel engines is complicated, among other things, due to the fact that these oils have a highly temperature-dependent viscosity. This viscosity is substantially higher than that of diesel fuel at low temperatures.

Customary conversions for operating diesel engines with vegetable oils take into account that such oils are barely usable as a fuel by starting the engines with diesel fuel and only switching over to the vegetable oil fuel once the engine and the injection system have reached their operating temperature. In this case, the engine needs to be changed back to diesel fuel a sufficiently long time before the engine is shut off (e.g., conversions according to the Georg Lohmann or according to Kraft). This not only requires a fuel tank for vegetable oil, but also an additional tank for diesel fuel. It is particularly inconvenient that the fuel supply needs to be switched back to diesel fuel each time the engine is shut off for an extended period of time.

It is well known that the high viscosity of vegetable oils is one reason for their unsuitability as a fuel. Another problem arises when using vegetable oils in diesel engines, wherein this problem is also associated with the high viscosity and can be seen in that gases are very easily adsorbed or form inclusions in the form of bubbles in vegetable oils and are difficult to remove. In this case, the oils have a certain compressibility that can have negative effects on the operation of the injection system, e.g., in the form of cavitation, and may also cause problems with respect to the injection process. If at all, these problems are only solved insufficiently with conventional methods.

This results in various disadvantages that become noticeable, in particular, during long-term operation and the causes of which frequently cannot be correctly diagnosed. Consequently, it was determined that the use of vegetable oils is not feasible "in the long run." This statement is based on the following notions:

Cavitation damages in the injection pump are generally not recognized as such and only lead to noticeable damages after a relatively long operating time. Defective injection systems can lead to an incomplete combustion that, in turn, results in deposits on the pistons and cylinders.

An increased entrainment of fuel into the engine oil may also occur. The damages caused by these incidents also manifest themselves only after an extended operating time.

The invention is based on the objective of developing a method and a device that allow the unrestricted operation of diesel engines with a fuel that comprises vegetable oils or recycled vegetable oils.

In a method according to the preamble of Claim 1, this objective is attained with the characteristics disclosed in the characterizing portion of this claim. In a device according to the preamble of Claim 10, the corresponding objective is attained with the characteristics disclosed in said claim.

Additional developments and advantageous embodiments of the invention are respectively defined in the dependent claims.

The forcing pump that operates independently of the injection pump initially transfers the fuel from the tank into a storage reservoir by forcing the fuel through fuel filters that are realized in the form of pressure-resistant fiber filters.

Since the fuel filters are realized in the form of pressure-resistant fiber filters, they are able to withstand the increased pressures caused by the higher viscosity of vegetable oils without damages. This applies, in particular, to low temperatures.

The fuel supplied to the injection pump from the storage reservoir is rendered incompressible due to the ultrasonic treatment such that a flawless injection pattern is achieved under all practical operating conditions. A defective injection system can lead to an incomplete combustion such that deposits are formed on pistons and cylinders and an increased amount of fuel is entrained into the engine oil. Under certain circumstances, this also causes damages only after an extended operating time.

Gases can be very easily adsorbed or bound or form inclusions in the form of bubbles in vegetable oils and are difficult to remove. This is caused by the high viscosity of vegetable oils. In such instances, the oils have a certain compressibility that can have negative effects on the operation of the injection pump, e.g., due to cavitation. In addition, this may also cause problems in the injection process. If at all, these problems are only unsatisfactorily solved with conventional methods.

According to preliminary data obtained so far, the ultrasonic treatment causes a partial degassing to take place. In addition, the shattering of larger bubbles causes the remaining gases to be present in such small bubbles that the surface tension of the bubbles prevents any compressibility of the fuel as well as cavitation on system components under the pressures and pressure changes occurring in the system. However, a complete degassing is not required. For example, it suffices to sufficiently shatter existing bubbles.

If the injection system is defective, the utilization of vegetable oils causes the combustion to take place in a more uniform fashion and over a longer duration than diesel fuel. This leads to a significantly smoother running engine and consequently to a reduced load and reduced wear.

Since the runback of the injection pump is not conventionally conveyed into the tank, but rather back into the storage reservoir, the degassing process is promoted by the multiple recirculation while simultaneously preventing a repeated filtration in order to reduce the load on the fuel filter.

The fuel is preferably filtered by means of fiber filters consisting of glass fibers and/or plastic fibers.

This makes it possible to prevent the customary conglutination observed with conventional paper filters. Consequently, the volume flow required for a sufficient fuel supply is ensured.

The fuel level in the storage reservoir is preferably maintained between a predetermined minimum level and maximum level by controlling the forcing pump.

Due to this measure, the injection pump is always supplied with fuel that has passed through the injection pump several times.

In another embodiment, the fuel is conveyed into the tank via a return line, namely when a pressure relief valve is actuated once a predetermined limiting pressure on the fuel filter is reached.

This prevents the filters from building up a dangerously high pressure at the end of their service lives in case the electronic control of the fuel pump fails. Otherwise, this could result in the destruction of the filters such that unfiltered fuel reaches the storage reservoir and the injection nozzles.

According to one additional development, an additive can be introduced into the storage reservoir.

It may be sensible to admix an additive for improving the cold-starting characteristics and for preventing the fuel in the form of vegetable oil from solidifying (gelling), particularly at very low temperatures during the winter months. Since the described system is also able to operate with cold oil, such a measure can be limited to the initial starting phase only. In this case, it suffices to admix a few milliliters of a suitable additive to the fuel in the storage reservoir immediately (i.e., a few seconds) before the engine is shut off such that the additive is subsequently present when the engine is restarted.

It would also be possible to heat the injection nozzles and the fuel before and during the start of the diesel engine with the aid of an inductive eddy current heating system.

A pulse-width control ensures that the optimal temperature is rapidly reached and then maintained.

Cold and highly viscous vegetable oils cannot be atomized by the injection nozzles of the diesel engine in such an optimal fashion that a flawless ignition is ensured. It is generally known to utilize heaters for maintaining the vegetable oils used within a temperature range that results in a sufficiently low viscosity for flawlessly atomizing the fuel. However, these heaters act upon the fuel situated upstream of the injection pump. This means that they are very sluggish and require more energy than that supplied by the storage battery.

This is the reason why one usually resorts to starting the engine with diesel fuel and, if applicable, heating the supply of vegetable oil. This can only be repeated during the next start of the engine if the system was changed back to diesel fuel a sufficiently long time before extended idle periods. A second tank for diesel fuel is required in this case. This method is complicated and very inconvenient.

These disadvantages are completely eliminated with the described method. A dual-tank system is no longer required because this method also makes it possible to directly start the engine with vegetable oils under all practically occurring temperatures.

According to one additional development intended for use in electronically controlled injection systems, the signal of a sensor used for controlling the injection time, particularly a needle-lift sensor, is amplified by means of high-speed electronics and transmitted to the electronically controlled injection system with a defined delay.

In modern diesel engines, the operating parameters are monitored and controlled with the aid of a so-called EDC (electronic diesel control). The actual injection time, in particular, is signaled with the aid of a so-called needle-lift sensor and compared with the optimal value for the respective operating mode that is usually stored in a family of characteristics in an EPROM. The injection time is corrected if these values deviate from one another. However, the higher viscosity of vegetable oils causes the optimal injection time to lie before the optimal injection time for the operation with diesel fuel, particularly at lower speeds.

The needle-lift sensor operates inductively, i.e., it reacts to accelerations. When operating with diesel fuel, the signals are so weak, particularly at low speeds, that a signal evaluable by the EDC is not delivered in each working period. The increased damping of the needle-lift sensor caused by the higher viscosity of vegetable oils additionally attenuates this signal, preferably also at low speeds.

In order to correct the inferior engine performance resulting thereof, the signals of the needle-lift sensor are transmitted to the EDC after being processed with the aid of suitable amplification electronics that also make it possible to realize a certain delay of the signal. In this case, the delay can be either adjusted manually or automatically, e.g., based on a viscosity measurement, in order to optimize the engine performance for the operation with diesel fuel or different vegetable oils or mixtures of diesel fuel and different vegetable oils.

The power supply of the electronics is preferably realized with the signal of the needle-lift sensor.

The power supply of the described electronics can be obtained directly from the signal of the needle-lift sensor if suitable electronic components are chosen. This simplifies the installation and prevents possible errors during the installation that could, if applicable, lead to the function of the EDC being impaired by external voltages.

In the device according to the invention, the forcing pump may be realized in the form of a gear pump and driven by an electronically controlled electric motor.

This makes it possible to reach the pressures required for forcing the fuel through the fuel filter. However, an electronic control of the electric driving motor is required in order to prevent extremely high pressures from building up when the fuel filter is near the end of its service life. The control evaluates, for example, the current consumption of the driving motor or a variable of the pressure difference between the intake and the outlet side of the fuel filter and generates a timely request for a filter exchange and/or ensures that the fuel transport is interrupted sufficiently long before the fabric filter is damaged due to the high differential pressure and unfiltered fuel is delivered to the injection pump.

The forcing pump may be connected to a control that maintains the fuel level in the storage reservoir between a predetermined minimum level and maximum level.

Since the fuel pump or injection pump always needs to convey more fuel than the respectively consumed quantity in order to ensure the cooling, the lubrication and the pressure build-up, a return line usually ensures that excess fuel is returned into the tank. However, the invention is modified in such a way that a small storage reservoir is arranged behind the fuel filter referred to flow direction, wherein the fuel pump fills this storage reservoir to a certain level in an electronically controlled fashion. The injection pump is supplied with fuel from this reservoir, and excess fuel is also returned into this reservoir. This makes it possible to directly supply the injection pump with already filtered fuel that is not remixed with unfiltered fuel and consequently does not have to be filtered anew. The fuel supply to the storage reservoir is not switched on again until the fuel level has dropped to a predetermined minimum. This arrangement provides the additional advantage that the fuel pump only needs to be designed for pumping the actually required quantity of fuel, i.e., the fuel pump does not have to be so large that it is able to pump the entire volume flow through the injection pump.

The ultrasonic treatment device may comprise an inductive, piezoelectric or magnetostrictive ultrasonic generator that is arranged on or in the housing of the storage reservoir.

The ultrasonic generator is arranged sufficiently far below the fuel surface such that significant movements of the surface caused, for example, by resonances and/or standing waves are prevented, namely because they could easily lead to undesirable gas inclusions that would reverse the desired effect. In practical applications, a magnetostrictive ultrasonic generator proved more suitable than a piezoelectric ultrasonic generator.

According to an additional development, an inductive heater can be coupled to the injection nozzles before and during the start of the diesel engine.

The targeted heating of the injection nozzles causes the fuel injected into the cylinders to be pre-heated with little imported energy and sluggishness, namely in such a way that it can be sufficiently atomized and a flawless cold start is already possible with vegetable oils. This means that an additional diesel mode can be eliminated. The control of the heater is preferably realized in the form of a pulse-width control.

The inductive heating of the injection nozzles is realized by installing coils around the injection nozzles. The coils are realized in the form of bifilar compound coils.

It was determined that a particularly effective heating of the injection nozzles can be achieved by means of inductive high-frequency heating (approximately 10 KHz) with pulse-width control. In this case, a resonance coupling with brief and very high pulsed currents with a total power of approximately 2 kWs (kilowatt seconds) makes it possible to generate the heating power required for ensuring a flawless start. This means that only about 5 Ah are withdrawn from the storage battery. In practical applications, it proved advantageous, under certain circumstances, to operate the inductive heater in a continuous mode with a significantly reduced power (approximately 10-150 Watt) in order to achieve a smoothly running engine.

Figure 2:
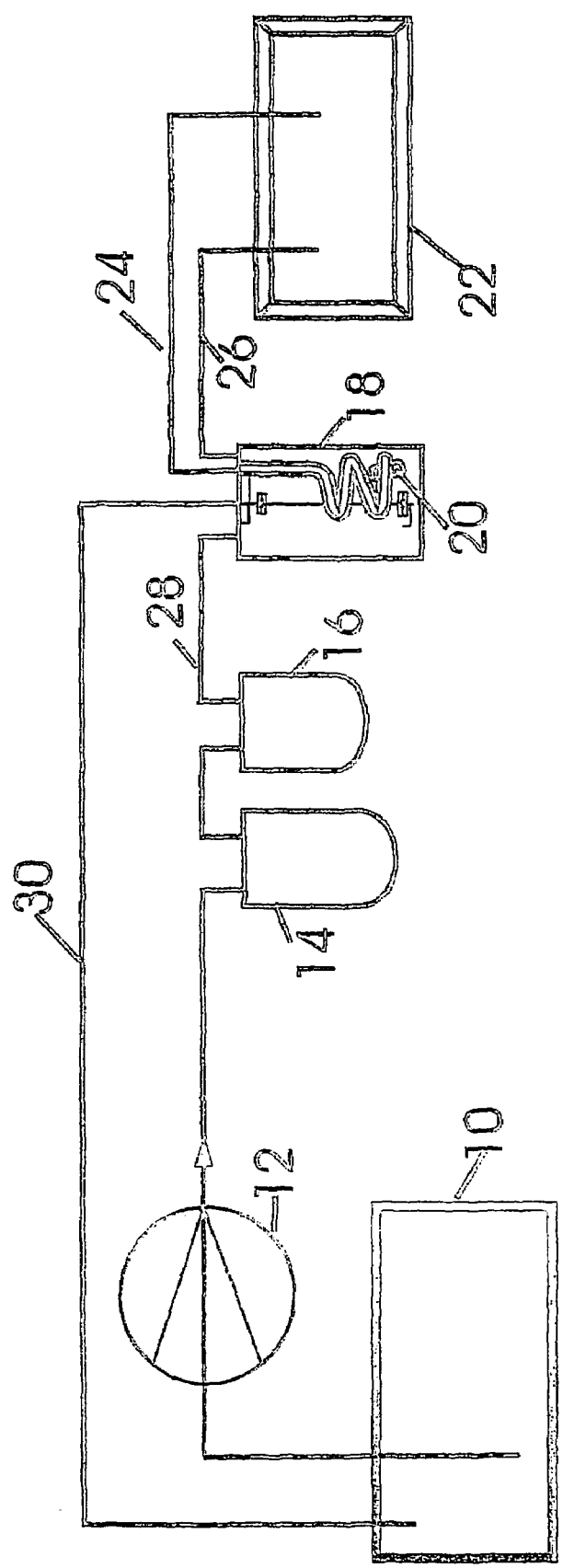
Figure 3:
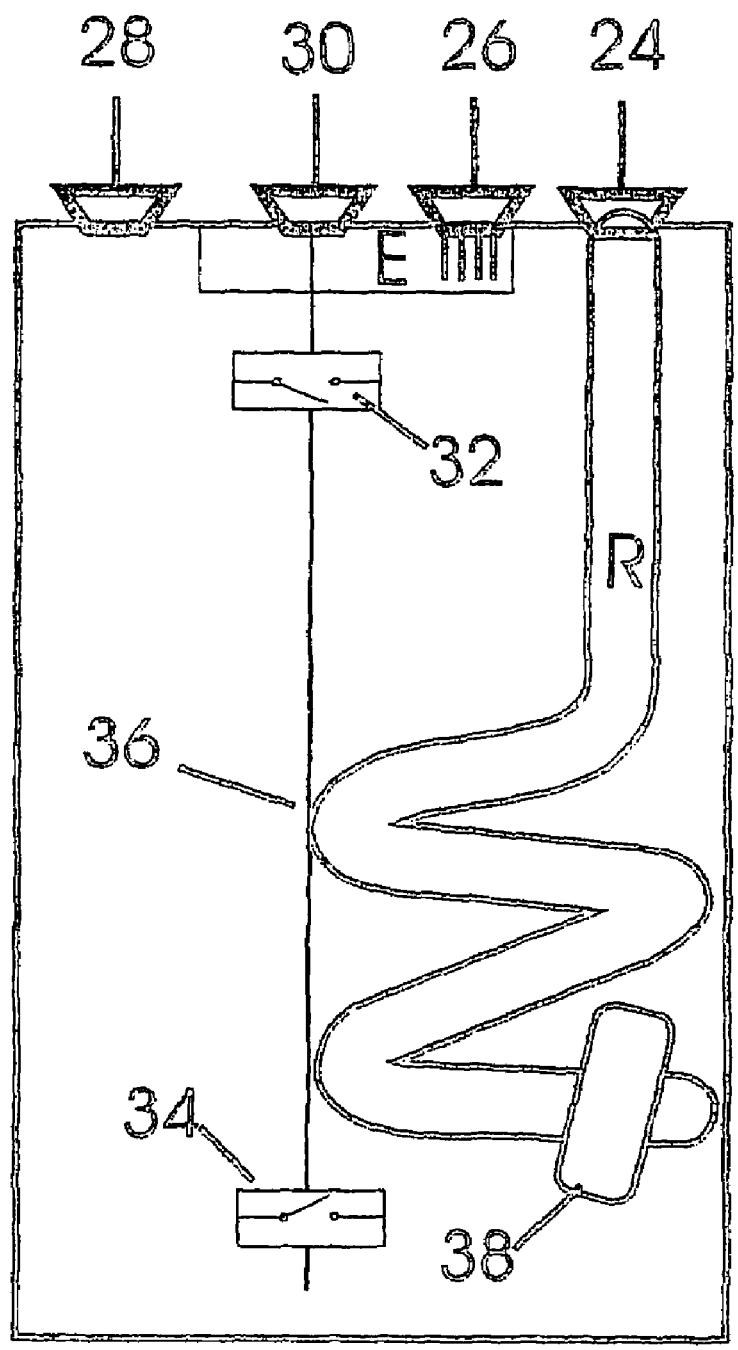

The invention is described below with reference to the figures. The figures show:

FIG. 1, a diagram for elucidating the kinematic viscosity (viscosity referred to the density) of a few vegetable oils in comparison with that of diesel fuel;

FIG. 2, a schematic representation of a device according to the invention for processing fuel, and FIG. 3, a detailed representation of the storage reservoir shown in FIG. 2.

FIG. 1 shows a diagram for elucidating the kinematic viscosity, i.e., the viscosity referred to the density, of a few vegetable oils in comparison with that of diesel fuel. The viscosity of diesel fuel is very low at low temperatures. However, vegetable oils have a viscosity that is higher by at least a factor of 10 at low temperatures. This explains their unsuitability as a replacement for diesel fuel unless a special fuel processing means is provided. The viscosities of the vegetable oils indicate that only the use of vegetable oils results in problems with respect to the cold-starting of the engine.

FIG. 2 shows a schematic representation of a device according to the invention for processing vegetable oils such that they are suitable for operating a diesel engine.

Only one tank 10 is required because the device according to the invention makes it possible to operate a diesel engine with vegetable oils only, i.e., without requiring additional diesel fuel. The fuel is withdrawn from the tank 10 by means of a forcing pump 12 that is realized in the form of a gear pump for forcing the fuel through a preliminary filter 14 as well as a fuel filter 16 in the form of a glass fiber filter. The fuel is then transferred into a storage reservoir 18 via a flow line 28. The storage reservoir 18 has a significantly smaller volume than the tank 10.

Conventional paper filters used for diesel fuel tend to conglutinate when using vegetable oils. The fiberglass filter 16, in contrast, allows fuel to pass until it reaches the end of its service life.

An ultrasonic treatment device 20 is arranged in the storage reservoir 18, wherein this ultrasonic treatment device serves for degassing the fuel and for shattering remaining gas bubbles. An injection pump 22 arranged downstream of the storage reservoir 18 withdraws fuel from the storage reservoir 18 via a flow line 24 and injects the fuel required for the combustion into the cylinders. Excess fuel is returned into the storage reservoir 18 via a return line 26. A return line 30 leads back into the tank 10 in case the control of the forcing pump 12 fails and more fuel than necessary is pumped into the storage reservoir.

FIG. 3 shows a detailed representation of the storage reservoir 18 according to the FIG. 2. The storage reservoir 18 comprises an inlet 28 for supplying fuel from the fuel filter 16, a return line 30 leading back into the tank 10, a flow line 24 leading to the injection pump 22 and a return line 26 that originates at the injection pump 22.

The level in the storage reservoir is monitored with the aid of two level switches 32, 34. One level switch 32 monitors a predetermined maximum level and switches off the fuel pump 12 while the other level switch 34 monitors a predetermined minimum level and switches on the fuel pump 12. The additional return line 30 that leads from the storage reservoir 18 back into the tank 10 is installed for safety reasons in case the level control of the storage reservoir 18 fails. This return line 30 also fulfills a ventilation function.

An ultrasonic treatment device 20 is also arranged in the storage reservoir 18. In one embodiment that was tested accordingly, the ultrasonic treatment device 20 consisted of a helicoidally bent metal tube 36, the lower end of which was excited to carry out magnetostrictive vibrations in the ultrasonic range by an induction coil 38. The fuel 28 arriving from the fuel filter 16 is conveyed into the storage reservoir 18 by this tube 36. This arrangement makes it possible to adequately prevent significant surface movements that could lead to air inclusions. The return line 26 originating at the injection pump 22 is simultaneously utilized for cooling the electronics that serve for exciting the magnetostrictive ultrasonic vibrations with the aid of the coil 38.

An inductive pulse heating system for the injection nozzles is not illustrated in the figures and controlled electronically, wherein this inductive pulse heating system also assists in the continuous operation with altered operating data. In this case, an electronic control serves for realizing an automatic transition, if so required, from the starting mode to a continuous assist mode.

When utilizing all described measures, the device ensures a sufficiently high volume flow over the entire temperature range and viscosity range occurring in practical applications.

In EDC-controlled diesel engines, not-shown amplification electronics for amplifying and, if applicable, delaying needle-lift sensor pulses are additionally provided.

In electronically controlled injection pumps, high-speed amplification electronics are arranged upstream of the EDC in order to also bring the signal of the needle-lift sensor to a level that can be evaluated by the EDC at low speeds. These electronics also make it possible to delay the signal of the needle-lift sensor in the millisecond range such that the injection time can be corrected without having to manipulate the EDC. Such a delay may be practical because it allows an adaptation of the injection time to the properties of different fuels without manipulating the EDC, i.e., by utilizing the families of characteristics that are optimized for diesel fuel and stored in EPROMs. This delay can be realized automatically, and the control parameters required for this delay can be derived from the physical data of the respective fuel or fuel mixture used, e.g., with the aid of an automated viscosity measurement. The amplification of the signal ensures a signal level that delivers an evaluable signal during each working period of the EDC in any speed range.

According to the described method and device, practically all diesel engines used in passenger cars, utility vehicles and stationary machines can be converted such that they operate with vegetable oils. The converted engines can be operated with pure vegetable oils or pure diesel fuel or any mixing ratio therebetween, namely without having to carry out or change any adjustments when the fuel is changed.

The invention claimed is:

1. A method for operating a diesel engine with a fuel that comprises vegetable oils or recycled vegetable oils, wherein the fuel is withdrawn from a tank (10), filtered by means of fuel filters and injected into the cylinders through injection nozzles by means of an injection pump (22), and wherein excess fuel is returned, wherein the fuel is transferred from the tank (10) into a storage reservoir (18) by means of a forcing pump (12) that forces the fuel through fuel filters (14, 16) in the form of pressure-resistant fiber filters, and in that the fuel is treated by means of ultrasound in the storage reservoir (18) before it is introduced into the injection pump (22), wherein the injection pump (22) withdraws fuel by suction from the storage reservoir (18) and excess fuel is returned into the storage reservoir (18).

2. The method according to claim 1, wherein the fuel is filtered by means of fiber filters consisting of glass fibers and/or plastic fibers.

3. The method according to claim 1, wherein the fuel level in the storage reservoir (18) is maintained between a predetermined minimum level and maximum level by controlling the forcing pump (12).

4. The method according to claim 3, wherein the fuel is conveyed into the tank (10) via a return line by means of a pressure relief valve once a predetermined limiting pressure on the fuel filter (16) is reached.

5. The method according to claim 1, wherein an additive is introduced into the storage reservoir (18).

6. The method according to claim 1, wherein the injection nozzles and consequently the fuel are heated before and during the start of the diesel engine by means of an inductive eddy current heating system.

7. The method according to claim 6, wherein the inductive eddy current heating system is pulse-width control.

8. The method according to claim 1, wherein the signal of a sensor used for controlling the injection time in electronically controlled injection systems, particularly a needle-lift sensor, is amplified by means of high-speed electronics and transmitted to the electronically controlled injection system with a defined delay.

9. The method according to claim 8, wherein the power supply of the electronics is realized with the signal of the needle-lift sensor.

10. A device for operating a diesel engine with a fuel that comprises vegetable oils or recycled vegetable oils, with a tank (10) for the fuel, fuel filters, an injection pump (22) and injection nozzles for injecting the fuel into the cylinders, wherein excess fuel is returned, wherein a storage reservoir (18) is provided in addition to the tank (10), in that a forcing pump (12) and fuel filters (14, 16) in the form of pressure-resistant fiber filters are arranged between the tank (10) and the storage reservoir (18), wherein the fuel can be transferred from the tank (10) into the storage reservoir (18) by means of a forcing pump (12) that forces the fuel through the fuel filters (14, 16), in that an ultrasonic treatment device (20) for the fuel is arranged in the storage reservoir (18), and in that the injection pump (22) withdraws fuel by suction from the storage reservoir (18) and excess fuel is returned into the storage reservoir (18).

11. The device according to claim 10, wherein the fiber filters consist of glass fibers and/or plastic fibers.

12. The device according to claim 10, wherein the forcing pump (12) is realized in the form of a gear pump that can be driven by an electronically controlled electric motor.

13. The device according to claim 11, wherein the forcing pump (12) is connected to a control that makes it possible to maintain the fuel level in the storage reservoir between a predetermined minimum level and maximum level.

14. The device according to claim 10, wherein a pressure relief valve with a return line leading into the tank (10) is arranged between the forcing pump (10) and the fuel filter (16), wherein the fuel can be conveyed into the tank (10) by means of this pressure relief valve once a predetermined limiting pressure on the fuel filter (16) is reached.

15. The device according to one of claim 10, wherein a metering device for an additive is connected to the storage reservoir (18) via an injection line, wherein an additive can be introduced into the storage reservoir (18) by means of the metering device.

16. The device according to claim 10, wherein the ultrasonic treatment device (20) comprises an inductive, piezoelectric or magnetostrictive ultrasonic generator (38) that is arranged on or in the housing of the storage reservoir.

17. The device according to claim 10, wherein the injection nozzles can be inductively heated, and in that the corresponding heater is pulse-width controlled.

18. The device according to claim 17, wherein the inductive heater for the injection nozzles comprises coils that are placed around the injection nozzles.

19. The device according to claim 18, wherein the coils are realized in the form of bifilar compound coils.

20. The device according to claim 10, wherein the signal of a sensor used for controlling the injection time in electronically controlled injection systems, particularly a needle-lift sensor, can be amplified by means of high-speed electronics and transmitted to the electronically controlled injection system with a defined delay.

* * * * *